United States Patent
Hamedi et al.

(10) Patent No.: US 11,301,718 B2
(45) Date of Patent: Apr. 12, 2022

(54) SYSTEMS, METHODS, AND STORAGE MEDIA FOR TRAINING A MACHINE LEARNING MODEL

(71) Applicant: Adhark, Inc., South Boston, MA (US)

(72) Inventors: Jehan Hamedi, South Boston, MA (US); Zachary Halloran, Braintree, MA (US); Elham Saraee, Jamaica Plain, MA (US)

(73) Assignee: Vizit Labs, Inc., Boston, MA (US)

( * ) Notice: Subject to any disclaimer, the term of this patent is extended or adjusted under 35 U.S.C. 154(b) by 92 days.

(21) Appl. No.: 16/236,298

(22) Filed: Dec. 28, 2018

(65) Prior Publication Data

US 2020/0210764 A1 Jul. 2, 2020

(51) Int. Cl.
| | |
|---|---|
| *G06K 9/62* | (2022.01) |
| *G06Q 30/02* | (2012.01) |
| *G06N 3/08* | (2006.01) |
| *G06V 10/20* | (2022.01) |

(52) U.S. Cl.
CPC .......... *G06K 9/6256* (2013.01); *G06N 3/08* (2013.01); *G06Q 30/0269* (2013.01); *G06V 10/255* (2022.01)

(58) Field of Classification Search
CPC ...... G06K 9/6256; G06K 9/3241; G06N 3/08; G06Q 30/0269
See application file for complete search history.

(56) References Cited

U.S. PATENT DOCUMENTS

| | | | |
|---|---|---|---|
| 8,494,897 B1 * | 7/2013 | Dawson | G06Q 10/10 705/7.33 |
| 9,996,890 B1 * | 6/2018 | Cinnamon | G06T 1/0007 |
| 10,176,198 B1 * | 1/2019 | Dhua | G06F 17/30247 |
| 10,410,108 B2 * | 9/2019 | Shaji | G06K 9/036 |
| 10,861,077 B1 * | 12/2020 | Liu | G06Q 30/0601 |
| 2012/0030711 A1 * | 2/2012 | Rae | H04N 21/4532 725/46 |
| 2016/0098844 A1 * | 4/2016 | Shaji | G06T 9/00 382/156 |
| 2016/0335120 A1 * | 11/2016 | Gupta | G06F 9/547 |
| 2017/0024761 A1 * | 1/2017 | Ruiz | G06Q 30/0273 |
| 2018/0174190 A1 * | 6/2018 | Ferreira | G06Q 30/0246 |
| 2019/0026609 A1 * | 1/2019 | Shen | G06K 9/6259 |

(Continued)

OTHER PUBLICATIONS

Lu, Xin, et al. "Rapid: Rating pictorial aesthetics using deep learning." Proceedings of the 22nd ACM international conference on Multimedia. 2014. (Year: 2014).*

(Continued)

*Primary Examiner* — Li B. Zhen
*Assistant Examiner* — Henry Nguyen
(74) *Attorney, Agent, or Firm* — Foley & Lardner LLP

(57) ABSTRACT

Systems, methods, and storage media for training a machine learning model are disclosed. Exemplary implementations may select a set of training images for a machine learning model, extract object features from each training image to generate an object tensor for each training image, extract stylistic features from each training image to generate a stylistic feature tensor for each training image, determine an engagement metric for each training image, and train a neural network comprising a plurality of nodes arranged in a plurality of sequential layers.

32 Claims, 6 Drawing Sheets

(56) References Cited

U.S. PATENT DOCUMENTS

2019/0080176 A1\* 3/2019 Lan ................... G06N 3/0454
2019/0080456 A1\* 3/2019 Song ................... G06N 3/0454
2019/0147340 A1\* 5/2019 Zhang .................. G06N 3/082
　　　　　　　　　　　　　　　　　　　706/25
2019/0245925 A1\* 8/2019 Yamamoto ........... G06F 16/958

OTHER PUBLICATIONS

Selvaraju, et al. "Grad-CAM: Visual Explanations from Deep Networks via Gradient-based Localization," (2017), 2017 IEEE International Conference on Computer Vision pp. 618-626.

\* cited by examiner

SYSTEMS, METHODS, AND STORAGE MEDIA FOR TRAINING A MACHINE LEARNING MODEL

FIELD OF THE DISCLOSURE

The present disclosure relates to systems, methods, and storage media for training a machine learning model.

BACKGROUND

Many people use the internet every day. Some use it to discover information such as news, recipes, phone numbers, etc. Some use the internet to communicate with others through mediums such as chat rooms, message boards, and e-mail. Traffic on the internet is large and many people use the internet for extended amounts of time.

Users of the internet may also use the internet to such a degree that advertisers can effectively market goods and services to customers or potential customers using the internet. For example, a host or administrator of a website may place advertisements on popular pages of their website. Such advertisements may be related to other parts of the website or goods that can be purchased that are related to the website. In another example, such advertisements can be unrelated to the website. For example, the website host or administrator may sell space to advertise on and within the website to third parties, much like a billboard might sell or lease ad space to third parties who would like passersby to see the advertisement.

SUMMARY

At least one aspect of the present disclosure relates to a system configured for training a machine learning model. The system may include one or more hardware processors configured by machine-readable instructions. The processor(s) may be configured to select a set of training images for a machine learning model. The processor(s) may be configured to extract object features from each training image to generate an object tensor for each training image. The processor(s) may be configured to extract stylistic features from each training image to generate a stylistic feature tensor for each training image. The processor(s) may be configured to determine an engagement metric for each training image. The engagement metric corresponding to a performance score. The processor(s) may be configured to train a neural network including a plurality of nodes arranged in a plurality of sequential layers. Training the neural network may include propagating information included in the object tensor for each training image through each layer of the neural network including an input layer and propagating information included in the stylistic feature tensor for each training image through a subset of the layers of the neural network not including the input layer. The layers of the neural network may include at least a classification layer to determine probabilities for each of a plurality of ranges of performance scores for a candidate image.

In some implementations of the system, the layers of the neural network may further include a regression layer, downstream from the classification layer, to determine a first performance score based on the probabilities determined by the classification layer.

In some implementations of the system, the processor(s) may be configured to identify a target audience. In some implementations of the system, the processor(s) may be configured to determine a first web-based property associated with the target audience. The first web-based property may include a plurality of images and may be determined based on engagement of the target audience with the plurality of images. In some implementations of the system, the processor(s) may be configured to determine a plurality of additional web-based properties associated with the target audience. In some implementations of the system, the plurality of additional web-based properties each may include a respective additional plurality of images. In some implementations of the system, the processor(s) may be configured to identify a subset of web-based properties from among the first web-based property and the additional web-based properties that are most uniquely visited by the target audience. In some implementations of the system, the processor(s) may be configured to select the set of training images from among the images included in the subset of web-based properties.

In some implementations of the system, the processor(s) may be configured to determine a respective visual influence metric for each of the first web-based property and the plurality of additional web-based properties. In some implementations of the system, the processor(s) may be configured to identify the subset of web-based properties based on the respective visual influence metrics.

In some implementations of the system, at least one web-based property of the subset of web-based properties may include a social media account.

In some implementations of the system, the processor(s) may be configured to normalize the engagement metric for each training image based on a size of its audience.

In some implementations of the system, the processor(s) may be configured to normalize the engagement metric for each training image based on engagement of the audience with the plurality of images included in the respective web-based property over time.

In some implementations of the system, extracting the object features from each training image may further include propagating data corresponding to each training image through an object detection neural network including an input layer, a plurality of intermediate layers, and an output layer. In some implementations of the system, extracting the object features from each training image may further include extracting outputs from at least one of the plurality of intermediate layers of the object detection neural network.

In some implementations of the system, the processor(s) may be configured to extract scene features from each training image to generate a scene tensor for each training image. In some implementations of the system, the processor(s) may be configured to concatenate the object tensor and the scene tensor for each training image to generate a concatenated tensor for each training image. In some implementations of the system, the processor(s) may be configured to propagate information included in the concatenated tensor for each training image through each layer of the neural network including the input layer of the neural network.

In some implementations of the system, the processor(s) may be configured to extract at least one of a set of intensity features, a set of color features, a set of composition features, a set of contrast features, and a set of blurriness features from each training image. In some implementations of the system, the processor(s) may be configured to propagate the at least one of the set of intensity features, the set of color features, the set of composition features, the set of contrast features, and the set of blurriness features from each training image through a second subset of the layers of the neural network not may include the input layer to further train the neural network.

In some implementations of the system, the processor(s) may be configured to identify a candidate image. In some implementations of the system, the processor(s) may be configured to propagate data corresponding to the candidate image through the neural network to determine a performance score for the candidate image, subsequent to training the neural network.

Another aspect of the present disclosure relates to a method for training a machine learning model. The method may include selecting a set of training images for a machine learning model. The method may include extracting object features from each training image to generate an object tensor for each training image. The method may include extracting stylistic features from each training image to generate a stylistic feature tensor for each training image. The method may include determining an engagement metric for each training image. The engagement metric corresponding to a performance score. The method may include training a neural network including a plurality of nodes arranged in a plurality of sequential layers. Training the neural network may include propagating information included in the object tensor for each training image through each layer of the neural network including an input layer and propagating information included in the stylistic feature tensor for each training image through a subset of the layers of the neural network not including the input layer. The layers of the neural network may include at least a classification layer to determine probabilities for each of a plurality of ranges of performance scores for a candidate image.

In some implementations of the method, the layers of the neural network may further include a regression layer, downstream from the classification layer, to determine a first performance score based on the probabilities determined by the classification layer.

In some implementations of the method, it may include identifying a target audience. In some implementations of the method, it may include determining a first web-based property associated with the target audience. The first web-based property may include a plurality of images and may be determined based on engagement of the target audience with the plurality of images. In some implementations of the method, it may include determining a plurality of additional web-based properties associated with the target audience. In some implementations of the method, the plurality of additional web-based properties each may include a respective additional plurality of images. In some implementations of the method, it may include identifying a subset of web-based properties from among the first web-based property and the additional web-based properties that are most uniquely visited by the target audience. In some implementations of the method, it may include selecting the set of training images from among the images included in the subset of web-based properties.

In some implementations of the method, it may include determining a respective visual influence metric for each of the first web-based property and the plurality of additional web-based properties. In some implementations of the method, it may include identifying the subset of web-based properties based on the respective visual influence metrics.

In some implementations of the method, at least one web-based property of the subset of web-based properties may include a social media account.

In some implementations of the method, it may include normalizing the engagement metric for each training image based on a size of its audience.

In some implementations of the method, it may include normalizing the engagement metric for each training image based on engagement of the audience with the plurality of images included in the respective web-based property over time.

In some implementations of the method, extracting the object features from each training image may further include propagating data corresponding to each training image through an object detection neural network including an input layer, a plurality of intermediate layers, and an output layer. In some implementations of the method, extracting the object features from each training image may further include extracting outputs from at least one of the plurality of intermediate layers of the object detection neural network.

In some implementations of the method, it may include extracting scene features from each training image to generate a scene tensor for each training image. In some implementations of the method, it may include concatenating the object tensor and the scene tensor for each training image to generate a concatenated tensor for each training image. In some implementations of the method, it may include propagating information included in the concatenated tensor for each training image through each layer of the neural network including the input layer of the neural network.

In some implementations of the method, it may include extracting at least one of a set of intensity features, a set of color features, a set of composition features, a set of contrast features, and a set of blurriness features from each training image. In some implementations of the method, it may include propagating the at least one of the set of intensity features, the set of color features, the set of composition features, the set of contrast features, and the set of blurriness features from each training image through a second subset of the layers of the neural network not may include the input layer to further train the neural network.

In some implementations of the method, it may include identifying a candidate image. In some implementations of the method, it may include propagating data corresponding to the candidate image through the neural network to determine a performance score for the candidate image, subsequent to training the neural network.

Yet another aspect of the present disclosure relates to a non-transient computer-readable storage medium having instructions embodied thereon, the instructions being executable by one or more processors to perform a method for training a machine learning model. The method may include selecting a set of training images for a machine learning model. The method may include extracting object features from each training image to generate an object tensor for each training image. The method may include extracting stylistic features from each training image to generate a stylistic feature tensor for each training image. The method may include determining an engagement metric for each training image. The engagement metric corresponding to a performance score. The method may include training a neural network including a plurality of nodes arranged in a plurality of sequential layers. Training the neural network may include propagating information included in the object tensor for each training image through each layer of the neural network including an input layer and propagating information included in the stylistic feature tensor for each training image through a subset of the layers of the neural network not including the input layer. The layers of the neural network may include at least a classification layer to determine probabilities for each of a plurality of ranges of performance scores for a candidate image.

In some implementations of the computer-readable storage medium, the layers of the neural network may further include a regression layer, downstream from the classification layer, to determine a first performance score based on the probabilities determined by the classification layer.

In some implementations of the computer-readable storage medium, the method may include identifying a target audience. In some implementations of the computer-readable storage medium, the method may include determining a first web-based property associated with the target audience. The first web-based property may include a plurality of images and may be determined based on engagement of the target audience with the plurality of images. In some implementations of the computer-readable storage medium, the method may include determining a plurality of additional web-based properties associated with the target audience. In some implementations of the computer-readable storage medium, the plurality of additional web-based properties each may include a respective additional plurality of images. In some implementations of the computer-readable storage medium, the method may include identifying a subset of web-based properties from among the first web-based property and the additional web-based properties that are most uniquely visited by the target audience. In some implementations of the computer-readable storage medium, the method may include selecting the set of training images from among the images included in the subset of web-based properties.

In some implementations of the computer-readable storage medium, the method may include determining a respective visual influence metric for each of the first web-based property and the plurality of additional web-based properties. In some implementations of the computer-readable storage medium, the method may include identifying the subset of web-based properties based on the respective visual influence metrics.

In some implementations of the computer-readable storage medium, at least one web-based property of the subset of web-based properties may include a social media account.

In some implementations of the computer-readable storage medium, the method may include normalizing the engagement metric for each training image based on a size of its audience.

In some implementations of the computer-readable storage medium, the method may include normalizing the engagement metric for each training image based on engagement of the audience with the plurality of images included in the respective web-based property over time.

In some implementations of the computer-readable storage medium, extracting the object features from each training image may further include propagating data corresponding to each training image through an object detection neural network including an input layer, a plurality of intermediate layers, and an output layer. In some implementations of the computer-readable storage medium, extracting the object features from each training image may further include extracting outputs from at least one of the plurality of intermediate layers of the object detection neural network.

In some implementations of the computer-readable storage medium, the method may include extracting scene features from each training image to generate a scene tensor for each training image. In some implementations of the computer-readable storage medium, the method may include concatenating the object tensor and the scene tensor for each training image to generate a concatenated tensor for each training image. In some implementations of the computer-readable storage medium, the method may include propagating information included in the concatenated tensor for each training image through each layer of the neural network including the input layer of the neural network.

In some implementations of the computer-readable storage medium, the method may include extracting at least one of a set of intensity features, a set of color features, a set of composition features, a set of contrast features, and a set of blurriness features from each training image. In some implementations of the computer-readable storage medium, the method may include propagating the at least one of the set of intensity features, the set of color features, the set of composition features, the set of contrast features, and the set of blurriness features from each training image through a second subset of the layers of the neural network not may include the input layer to further train the neural network.

In some implementations of the computer-readable storage medium, the method may include identifying a candidate image. In some implementations of the computer-readable storage medium, the method may include propagating data corresponding to the candidate image through the neural network to determine a performance score for the candidate image, subsequent to training the neural network.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
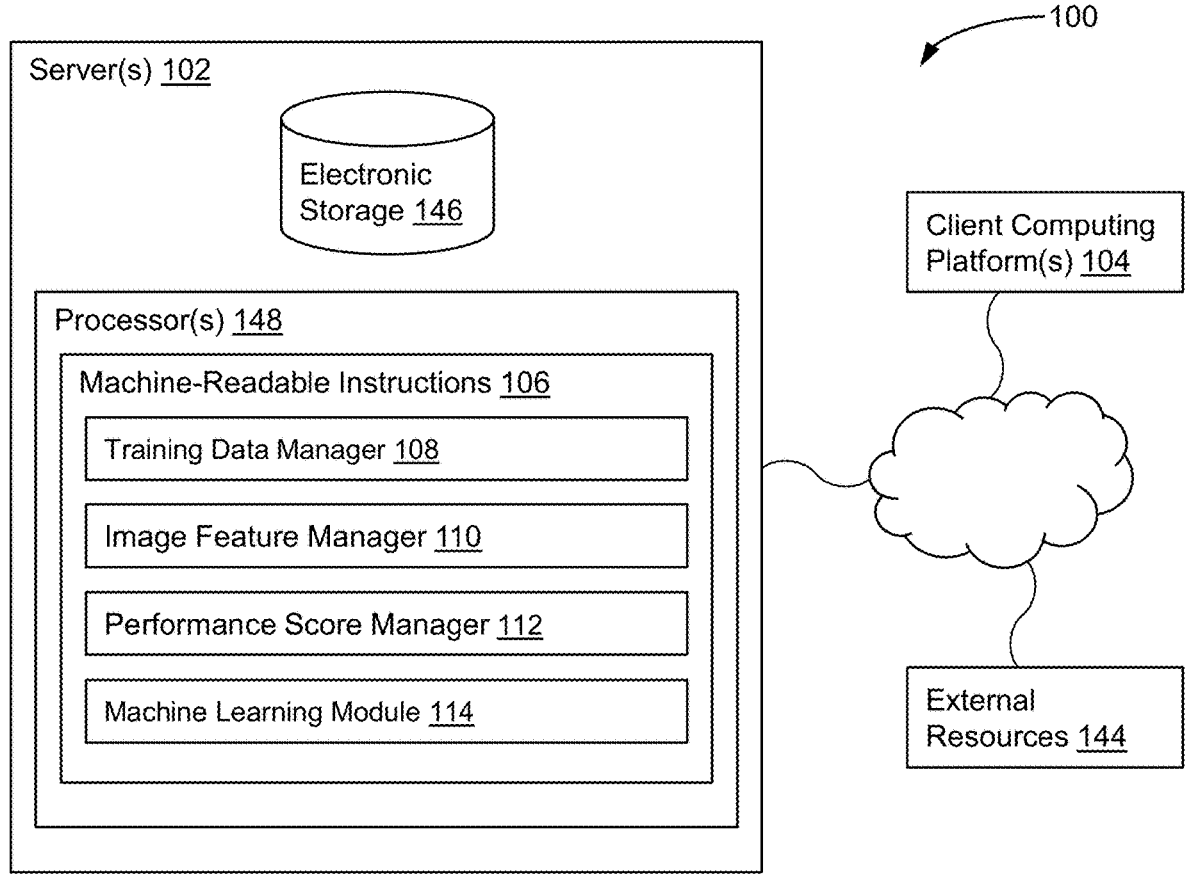
FIG. 1 illustrates a system configured for training a machine learning model, in accordance with one or more implementations.

Image-based content can be among the most important content posted by users to web-based or online platforms, such as social media websites and other websites. Such content can also be referred to as "creative," and can be included as part of an advertising campaign of a business, a post from an individual that contributes to the individual's online image, a graphic design composition using a software application like PhotoShop, or a photograph captured via a user's camera on a mobile device. Often, users (e.g., businesses or individuals) post content items such as images that are intended to appeal to a group of viewers who share a particular set of demographic characteristics. Such a group can be referred to as a target audience or intended audience.

Selecting the best content (e.g., images), and the right attributes of content, can improve the performance of the content among the target audience. For example, performance of content can be or can relate to audience awareness, customer engagement, memorability, preference, conversions, and sales resulting from or related to the content. However, it can be difficult for a user to know in advance how a particular content item is likely to perform among a target audience. Inefficient and inaccurate "guess and check" techniques can be common practice. As a result, a large amount of capital can be wasted on "AB testing" of content items, because it is difficult to determine in advance which content items will perform best. Thus, advertising and other forms of content generation and/or content publishing today often begin with a content item (e.g., an image or a video) that is published, and then subsequently finds an audience after it has been published, rather than first selecting a target audience and designing content specifically to appeal to the selected target audience. This process can be expensive and error-prone.

The systems and methods described in this disclosure can implement a scoring mechanism which can predict how a content item is likely to perform among a predetermined target audience. For example, various computer-implemented techniques, including artificial intelligence and machine learning algorithms, can be used to train a model (e.g., a neural network or other machine learning model) to generate a performance score for an image. The performance score can correspond to a prediction of how the image is likely to perform among a predetermined target audience. In addition, this disclosure provides techniques for gathering existing content items that have been viewed or engaged with by the target audience, and using actual performance metrics related to the existing content items to train the model that generates the performance score for a given image. Thus, the model can be trained using real-world information about the types of content that the audience prefers and is not limited to any one platform (i.e. the technology is platform-agnostic).

The model can also be applied to a limitless number of target audiences. Furthermore, the subject matter described in this disclosure can be used to overcome challenges in fields including consumer research, consumer testing, and market testing. For example, a consumer panel or focus group often takes a period of days or weeks, and a significant investment of capital, to evaluate candidate content items. Due to this time and expense, these techniques are often limited to very small samples of people and few examples of candidate content items. The performance scoring model describe in this disclosure can perform these types of analyses in real-time without soliciting feedback from any human users. In that way, the system can be used to effectively simulate the results of a focus group having a specified set of demographic or psychographic characteristics evaluating candidate content items. As a result, a user such as a designer or creative professional who is actively developing a new creative work can quickly and iteratively evaluate new concepts, or concept variations, using the techniques described in this disclosure to get fast results and insights to streamline their work.

The model described in this disclosure can also be applied to multiple audiences, thereby enabling a user to quantitatively determine which image of multiple candidate images is likely to be most effective across more than one target audience (e.g., a first target audience of men ages 18-24 and a second target audience of women ages 34-55), which using traditional research techniques may require two distinct sample populations to be surveyed independently.

The model can also be applied to search indexing. For example, the model can be trained using any set of training data, which may include a set of training data based on image subject matter rather than a particular target audience. In some implementations, the model can be trained to evaluate images having common subject matter, such as images that depict an apple. Continuing with this example, using such a model, instead of searching through hundreds of pages of search results related to the search term "apple" and subjectively selecting one resulting images as the "best" picture of an apple, the model may be used to produce performance scores that are indexed with images that result from a search for the term "apple," which can enable a user to quickly find the best images of an apple for a particular target audience. This can improve time efficiency for content discovery and the image searching process, while also eliminating human operator guesswork about which images are likely to perform best among a target audience. Thus, the systems and methods described below represent a significant improvement in the fields of artificial intelligence and machine learning, as well as the fields of content development, electronic searching, business, marketing, design, consumer research, and testing performance optimization.

The subject matter described in this disclosure can be used to overcome challenges relating to the training of machine learning models with only limited data sets. For example, the performance scoring model may be trained in a manner that results in accurate performance scores even with access only to a relatively small set of training data. This can be achieved, for example, by first extracting stylistic features from a set of training images, rather than relying on the raw image data in the training images themselves to train the model. As a result, the model can be trained in a faster and more computationally efficient manner, relative to conventional techniques for training machine learning models. This can enable the model to run on computer hardware that does not require large amounts of memory.

Training a machine learning model based on raw image data of a set of training images can be difficult because there may not be significant meaning in the pixel-by-pixel variation of an image that relates to its perceived quality among an audience. Stated differently, raw image data may have a low signal-to-noise ratio for purposes of training a machine learning model. Because the training process for a machine learning model can cause the model to "learn" patterns in the training data, training data that contains a high level of noise may cause the model to erroneously determine that patterns resulting from the noise are important. To cause the model to recognize the more important patterns can require a very large training data set. As a result, a massive set of training images may be required in order to train such a model to produce good results in this manner. In some implementations, it may be very difficult or impossible to obtain such a large training data set, and it may be computationally intensive to train the model in this manner due to the size of the training data set. This disclosure addresses the technical challenges that arise from attempting to train a machine learning model based on raw image data by first extracting higher-level features from each training image. For example, such a feature can be any feature that may relate to more than one pixel in an image. These features can be referred to as "stylistic features," and may relate to aspects of an image such as a type of object shown in the image, a dominant color scheme in the image, a brightness or contrast of the image, etc. These features can also include features that relate to the overall presentation of material in an image, such as layout or composition features. Such features may matter more to a human viewer's perception of image quality than lower-level features (e.g., individual pixel features), and can therefore be more useful for training the model than the raw image data. The techniques of this disclosure can train a machine learning model based on these extracted features. As a result, the model can be trained more accurately with a much smaller training data set, which also can reduce computational complexity. In addition, training the model using a combination of different types of high-level features can allow the model to evaluate candidate images based on the interplay of these different features types relative to one another within the same image.

In some implementations, it can be difficult to identify and extract meaningful features from an image in an automated fashion. To address this technical challenge, in some implementations classification or detection networks can be used to extract features from an image. These types of networks can be used to classify an input image into one of a small number of states. For example, a detection network could be used to determine whether an image includes a dog (e.g., the model classifies images into two states, including one state for images that depict dogs and another state for images than do not depict dogs). Such a network may include nodes arranged in layers including an input layer, several hidden layers that form a "black box," and an output layer that provides an answer to the classification question. For many applications, the outputs of hidden layers of a classification network may not be of interest because they do not answer a classification question, and so they are often ignored. However, as described further below, the outputs of these hidden layers in a classification network that is used to process image data (e.g., an object detection network, a scene detection network, etc.) can provide useful information about features of an image that are important to human perception of image quality and subtle aspects of an image that tend to increase viewer engagement. This disclosure describes techniques for using such information to efficiently train a machine learning model. Such a machine learning model may make use of a wide range of such features in a set of training images, to improve the accuracy of the model's performance in evaluating a new candidate image that has not been previously analyzed by the model.

In some implementations, feature sets can be mathematically represented as tensors. Some feature sets can be much larger than others. In some implementations, larger feature sets can overwhelm smaller feature sets during training of a machine learning model. For example, due to differences in the size of certain features sets, the model may not properly account for the importance of a smaller feature set. To address this technical challenge, this disclosure provides techniques for introducing feature tensors at different layers of a machine learning model. For example, larger feature tensors may be introduced at an input layer of the model, and smaller feature tensors may be introduced at a hidden layer downstream from the input layer. This approach can allow smaller feature tensors to be given more significance than their small size would suggest for purposes of training the model, because they are introduced closer to the output.

As described above, unlike an end-to-end convolutional neural network, the machine learning model described in this disclosure can use image features extracted from a source image. For example, image features can be extracted using one or more other machine learning processes. In some implementations, such features may be reused for purposes of training multiple instances of the machine learning model in a manner that improves overall efficiency of the training process. For example, this can enable an "extract once, use many" framework whereby the extraction process is performed only once, but the extracted features can be reused any number of times to train multiple instances of the machine learning model. In some implementations, the extraction process may represent a majority of processor utilization (e.g., CPU and/or GPU utilization). Other computational work, such as training the model using the extracted features, may require substantially less resources. For example, if 97% of the resource utilization occurs in the extraction stage and only 3% occurs in during training of the model, then each additional pass through an instance of the model may only incur around 3% additional resource utilization, dramatically increasing the efficiency of the system.

FIG. 1 illustrates a system 100 configured for training a machine learning model, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

The server(s) 102 may be configured by machine-readable instructions 106. Machine-readable instructions 106 may include one or more instruction modules. The instruction modules may include computer program modules. The instruction modules may include one or more of a training data manager 108, an image feature manager 110, a performance score manager 112, a machine learning module 114, and/or other instruction modules.

Together, the training data manager 108, the image feature manager 110, the performance score manager 112, the machine learning module 114, and the other components of the system 100 can be configured to train a machine learning model for assigning a performance score to a candidate image. The performance score can represent a prediction of how well the candidate image will resonate with a predetermined target audience. Thus, to train the model to provide accurate performance scores, the system 100 may first gather, collect, receive, or otherwise access a set of training data to train the machine learning model. In some implementations, the training data can be based on characteristics of the target audience.

In some implementations, the target audience can be defined by one or more traits or characteristics shared by members of the target audience. For example, the target audience can be defined in terms of any combination of demographics, behavioral tendencies, lifestyle indicators, or other specific market segmentation criteria. In some implementations, the traits of the target audience can be received directly from a user of one or more of the client computing platforms 104. In some implementations, the user can transmit information corresponding to one or more traits of a desired target audience to the server 102. For example, the user can be a business interested in marketing a product to a particular target audience (e.g., sports fans between the ages of 18 and 34).

After the audience is defined, the training data manager 108 can be configured to identify the training data including a set of images that are viewed and/or interacted with members of the target audience. In some implementations, the training data can include images published to websites, such as social media accounts or business websites, that are typically viewed by members of the target audience. For example, such a website can be hosted by one or more of the client computing platforms 104. Such a website can be referred to as a web-based property, and may include any number of web pages, image files, and other electronic content that can be accessed by the server 102. In some examples, the target audience itself can be defined in terms of one or more web-based properties. For example, the target audience can include users who view, or follow, a particular web-based property, or otherwise engage with its published contents.

In order to learn the visual preferences for the target audience, the training data manager 108 can identify or determine the types of images, and attributes of those images, that the audience is visually engaged by. In some implementations, the training data manager 108 can derive this information algorithmically by looking at the target audience's Internet and social media activities and behaviors (e.g., the web-based properties they visit, the retailers they shop at, the influencers they follow on social media, the news and magazines they read, the social media contents they interact with, etc.). In some examples, web-based properties may be commercial in nature, but they do not need to be.

In some implementations, the training data manager 108 can identify at least one input property, which can also be referred to as a seed property, that is preferred by the target audience. For example, the seed property can be or can include a URL of a social media account, a website domain, or URLs of individual media content. The training data manager 108 can be configured to determine a set of other web-based properties that are visited by the same or similar group of users (e.g., the target audience) as the seed web-based property. In some implementations, the training data manager can determine the set of other web-based properties by applying a network analysis algorithm based on the visitors or published contents of the seed web-based property. In an illustrative example, the seed web-based property may include at least one consumer brand's page or content on a social media platform. Two metrics of such an account may be a number of followers of the account and a number of 'engagers' of the account. For example, an "engager" may be a user who has commented on or "liked" the contents published by that account. Thus, if a post from the web-based seed property was "liked" 25 times, the training data manager 108 can infer that there were 25 engagers of that content. In some implementations, the training data manager 108 can extract a sample list of followers or engagers of such an account, for example based on the followers' or engagers' usernames. The training data manager 108 may also identify accounts that are commonly followed by followers of the seed web-based property. In some implementations, this can be achieved using simple attribute matching-based approaches. In some implementations, this can be achieved using a webgraph, or a collection of websites, and the training manager 108 can identify websites that are commonly visited by a similar demographic, psychographic, or other behavior-based cohort of users. In some implementations, this can be achieved by identifying web-based properties that publish visually-similar contents on a visual graph. It should be understood that these techniques are exemplary only, and should be not interpreted as limiting the scope of this disclosure.

In some implementations, the training data manager can rank determined set of web-based properties based on a proportion (e.g., a "density") of the composition of the visitors of those web-based properties who are also members of the target audience and who interact with those properties. Visitors may include users who view the web-based properties, "followers" of the web-based properties, "content engagers" of the web-based properties, or any other users who interact with images published by the web-based properties, for example.

From this information, the training data manager 108 can identify a subset of the web-based properties that are most uniquely visited by the target audience. For example, based on a determination that the visitors who interact with a seed web-based property tend to share a set of characteristics (e.g., an audience that includes female yoga enthusiasts under 35 years old), the training data manager 108 can identify other properties that are also frequently visited by a high proportion of that same audience or a similar audience having overlapping characteristics. This process can allow the training data manager 108 to identify the subset of web-based properties preferred by the target audience.

In some implementations, the training data manager 108 can use this subset of web-based properties as the basis for harvesting one or more sets of images. These harvested images can be referred to as training images. For example, the training data manager 108 can examine social media accounts, business websites, and other online resources associated with the identified subset of web-based properties to locate the training images for the target audience. In some implementations, the training data manager 108 can apply analytical techniques to determine which of the identified subset of web-based properties have posted images on social media, or on another medium, and that have some type of interaction data associated with them. For example, the training data manager 108 may examine the volume and frequency of postings and the proportion of engagement earned on postings relative to total viewership of those postings made by the web-based property. The training data manager can then, based on a series of internal rules & algorithms, evaluate the usability of the information that can be derived from the web-based property, its suitability for different purposes within the system, and the importance of any data related to the property to the training process. The training data manager 108 may also examine the relevance of the image contents from a particular web-based property to a target audience relative to other images harvested on the audience outside of one individual web-based property. For example, the interaction data can include a number of "likes," a number of comments, etc. Such interaction data for a given image can also be referred to as an "engagement metric" for the image. In some implementations, the training data manager 108 can generate or determine an engagement metric for an image based on the interaction data for the image. An engagement metric for an image can be useful, because it can indicate whether the target audience prefers the image, relative to other images they have viewed or interacted with. Thus, if an image doesn't have any associated interaction data, then the training data manager 108 can remove that image from the set of training images.

In some implementations, the training data manager 108 can be configured to determine which of the identified subset of web-based properties are "visually influential" among the target audience. For example, the training data module can be configured to establish minimum thresholds for characteristics of a web-based property such as its size and popularity, quality of images posted to the web-based property, relevance of image content to the target audience, number of images posted to the web-based property, engagement thresholds with posted images (e.g., thresholds for any type or form of interaction data), user sentiment in the comments or other reactions to the images posted to the web-based property, etc.

In some examples, the training data manager 108 can determine visually influential properties based on one or more property categories that tend to be visually-rich. For example, web-based properties that are categorized as apparel or lifestyle can be identified as more visually influential, relative to other categories of web-based properties. In some implementations, the training data manager 108 can filter out or otherwise exclude images from web-based properties that are categorized as less visually influential. In some examples, less visually influential categories may include government and banking.

In some implementations, the training data manager 108 can normalize the engagement metrics for images based on a variety of factors. For example, the training data manager can apply a weight to the engagement metrics of images in the dataset based on engagement rates of each of the images. In one example, the training data manager 108 can divide an engagement metric for an image by a number of followers of its respective web-based property to determine a normalized engagement metric for the image. In another example, the training data manager 108 can normalize the engagement metric based on a number of views or impressions for each image. For example, if 100 users viewed images A and B, 50 users clicked on image A, and 75 users clicked on image B, then the training data manager 108 can normalize the engagement metrics to indicate that image B is more visually engaging that image A.

In some implementations, the training data manager 108 may be configured to normalize the engagement metric for a training image based on a size of its audience (e.g., a number of visitors to the web-based property on which the training image was published). For example, this can help to avoid ranking an image as high performing or low performing based primarily on the overall popularity of a web-based property on which the image is posted, rather than on the quality of the image itself. Thus, a lower quality image posted on a very popular website may not have a higher normalized engagement metric than a high quality image posted on a less popular website. Stated differently, the training data manager 108 can determine normalized engagement metrics for training images in a manner that prevents the size of an audience for the image (or for the web-based property that published the image) from overwhelming other information about the image. Audience size can be a factor of in determining a normalized engagement metric for an image, however normalized engagement metrics may not scale linearly with audience size. For example, a first training image and a second training image may each have a similar engagement metric. If the first image has an audience that is ten times as large as the audience for the second image, the training data manager 108 can determine that the normalized engagement metric for the first image should be larger than the normalized engagement metric for the second training image. However, in some implementations the training data manager 108 may determine a normalized engagement metric for the first training image that is less than ten times as large as the normalized engagement metric for the second training image. In some implementations, the training data manager 108 may be configured to normalize the engagement metric for each training image based on engagement of the audience with the plurality of images included in the respective web-based properties over time. For example, this can help to account for variations over time in audience size of a web-based property from which training images are gathered.

In some implementations, if a web-based property has too few followers, too few images, poor images, highly variable contents and themes, or poor engagement signals, the training data manager 108 can remove images from that web-based property from the training data. For example, even if the web-based property is popular among the target audience, the images published to that web-based property may not be visually engaging to the target audience and therefore may not provide value for the training data.

In some implementations, the training data manager 108 can use one or more sample images, rather than an entire web-based property, as the seed for the process of selecting training data. In this approach, the training data manager 108 can identify or receive an image of a subject matter that is relevant and preferred by a target audience and is therefore likely to be visually descriptive of the audience. Then, the training data manager 108 can identify a set of web-based properties based on the seed image, and can use these web-based properties as the basis for dataset generation as described above. In some implementations, the training data manager 108 can match an input image to a set of saved images (e.g., stored in the electronic storage 146. The training data manager 108 can then determine one or more best-fit web-based properties related to the saved images, and can use those web-based properties as the basis for gathering the training dataset.

In some implementations, the training data manager 108 can use a seed web-based property to find similar web-based properties based on visual material published from each web-based property. For example, if a target audience includes a men's fashion audience, the training data manager 108 can identify one example of a men's fashion web-based property to use as the seed, and can also identify similar web-based properties that also post images of men's fashion-related visual material to gather the training dataset. In some implementations, the training data manager 108 can receive a set of web-based properties representing the target audience directly from a user of one of the client-computing platforms 104. For example, the user may be a business who has performed their own market research to identify relevant web-based properties.

Conventional techniques for defining an audience and or selecting training data can include convening a focus group or survey of a number of members of a desired audience, showing them a large number of images, and asking them to rank those images by preference. This technique can similarly produce a labeled dataset of visual material preferred by the audience. However, using the techniques described above, the training data manager 108 can determine the target audience and gather training images in a manner that does not require this very time consuming, expensive, error-prone, and potentially biased manual process. As a result, training data gathered using the techniques disclosed herein can be more accurate and less biased, and the approaches can more easily be scaled to a large number of audiences. In some implementations, the images from all of the web-based properties identified by the training data manager 108 can become the training dataset.

In some implementations, the training data manager 108 may instead select a set of training images without a defined target audience. For example, the set of training images can be chosen based on the subject matter of the images themselves, rather than based on characteristics of users who visit the web-based properties from which the training images are harvested. Thus, the training data manager 108 can be configured to identify training images that relate to certain subject matter (e.g., based on metadata that may be associated with each training image, such as a text-based caption or description for each image). It should be understood that the techniques described below for training a machine learning model can be applied to any set of training images, regardless of whether the training images are collected based on a defined target audience.

In some implementations, the raw image data from the training dataset can be input into a machine learning model to train the machine learning model. For example, the machine learning model can be a neural network or other machine learning model implemented by the machine learning module 114. However, attempting to train such a model by using the raw image data can be computationally inefficient, and may require that the training dataset be very large in order to effectively train the model. To overcome this technical challenge, lower level features of the images, rather than the images themselves, can be used to train the model.

Figure 2:
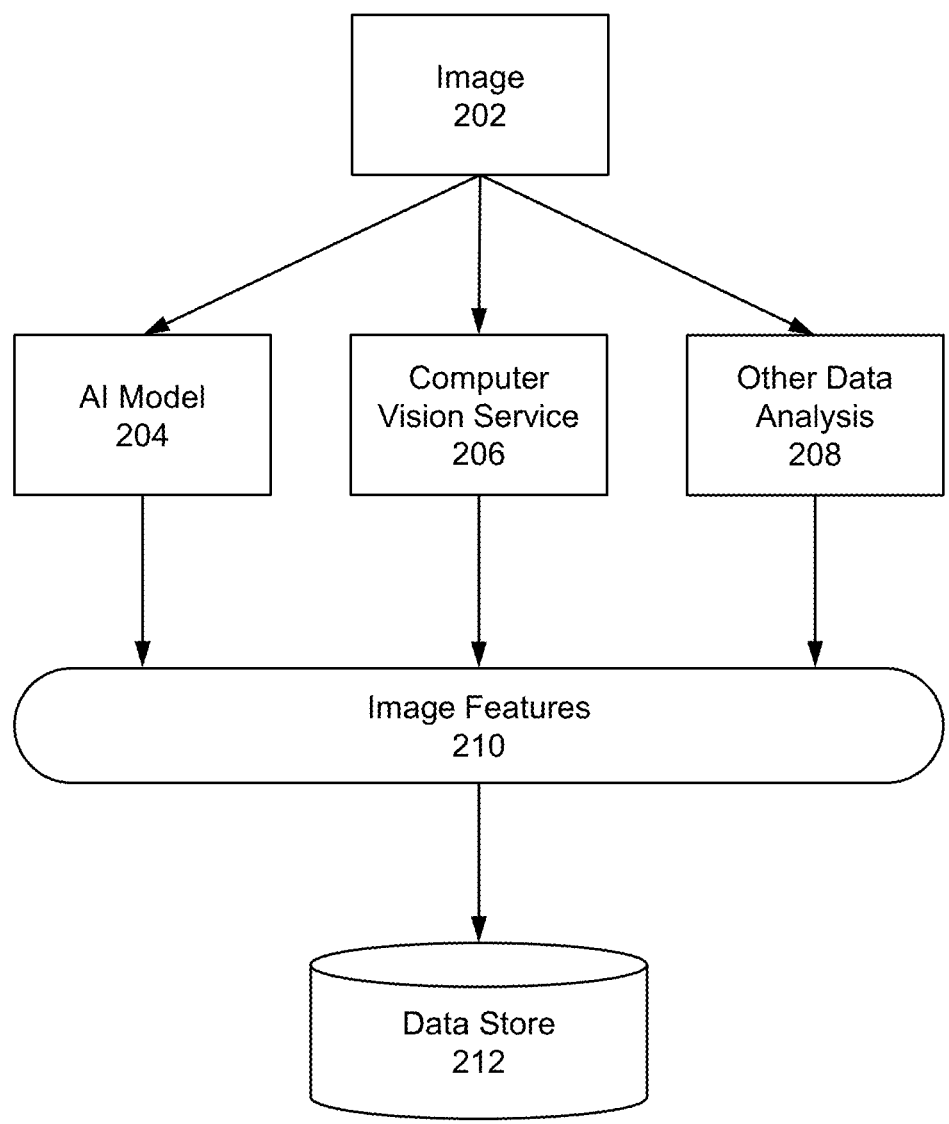
FIG. 2 illustrates data flow in a process for extracting features from images, in accordance with one or more implementations.

FIGS. 2-5 depict processes for extracting features from images, training a machine learning model, and using the trained model to generate a performance score for a candidate image. The processes depicted in FIGS. 2-5 can be implemented, for example, by the server 102 of FIG. 1. Thus, FIGS. 2-5 are described below with reference also to FIG. 1. Referring now to FIG. 2, the data flow in a process 200 for extracting features from images is illustrated, in accordance with one or more implementations. The process 200 can be performed, for example, by the image feature manager 110 of FIG. 1. It should be understood that, while FIG. 2 shows feature extraction for a single image 202, the process 200 can be repeated for any or all images in the training dataset. The process 200 can include using one or more artificial intelligence models 204, one or more computer vision services 206, and other data analysis techniques 208 to extract features from the image 202.

In some implementations, the image feature manager 110 can implement the one or more artificial intelligence models 204, the one or more computer vision services 206, and the other data analysis techniques 208. For example, the one or more artificial intelligence models 204, the one or more computer vision services 206, and the other data analysis techniques 208 can each include an artificial neural network that includes nodes arranged in a plurality of layers. Each node can be a computational unit, which may also be referred to as an artificial neuron. The layers can be arranged sequentially such that a node receives an input signal from one or more of the nodes in the previous layer, processes the input according to a function to produce an output, and transmits the output to one or more nodes of the next layer. The first layer of such a network can be referred to as an input layer, and can receive the raw image data (e.g., data corresponding to each individual pixel of the image 202). The final layer can be referred to as an output layer. Thus, the image data for the image 202 can be propagated through the layers of an artificial neural network to cause the artificial neural network to produce one or more outputs at each layer of the artificial network, including the final or output layer.

In some implementations, any of the one or more artificial intelligence models 204, the one or more computer vision services 206, and the other data analysis techniques 208 can be a detection network. For example, a detection network can be configured to determine a presence or absence of one or more predetermined characteristics of the image 202, such as the features of a scene depicted in the image 202, the features of objects depicted in the image 202, a color or colors most prevalent in the image 202, etc. Each such network can be used to extract a respective set of image features 210 from the image 202. Thus, a scene detection network can be used to extract a set of scene features from the image 202, an object detection network can be used to extract a set of object features from the image 202, etc.

In some implementations, the image feature manager 110 can use the outputs of an intermediate layer of an artificial neural network corresponding to any of the one or more artificial intelligence models 204, the one or more computer vision services 206, and the other data analysis techniques 208. An intermediate layer can be any layer between the input layer and the output layer. Thus, while a detection network may have an output layer that outputs a binary signal (e.g., indicating presence or absence of a particular trait in the image 202), the outputs of intermediate layers also can be relevant to image features 210 in the image 202. In some implementations, these intermediate outputs can be mathematically descriptive of the image 202 itself. In some implementations, the image feature manager 110 can extract the image features 210 based on the outputs of an intermediate layer of an artificial neural network (e.g., any of the one or more artificial intelligence models 204, the one or more computer vision services 206, and the other data analysis techniques 208), which may be represented as a vector, a tensor, or any other form of information.

The image features 210 that can be extracted from the image 202 by the image feature manager 110 are not limited to object, scene, or color features. For example, the features extracted from the image 202 can be or can include any stylistic features that may relate to any visual characteristic of an image, such as layout, position, symmetry, balance, arrangement, composition, pixel intensity, contrast, blurriness, object location, depth of field, angle of view, focal point, view point, vantage point, foreground/background content, white space/negative space, cropping, framing, color scheme, hue, tint, temperature, tone, saturation, brightness, shade, mood, line, angles, noise, contours, gradients, texture, repetition, patterns, blowout, blooming, concentricity, cubic attributes, geometric attributes, shadow, blocked shadow, vignetting, scale, number of objects, position of objects, spatial context, proportion, shapes, shape of objects, number of shapes, attributes of objects, form, perspective, representation, path, scenery, time of day, exposure, time lapse, typography, position of headline, size of headline, length of text, location of call-to-action, typeface, font, location of faces, posture/pose of people, location of figures, gestures, action/activities of people, number of people, hair color of people, ethnicity of people, gender of people, age of people, expressions and emotions of people, facial attributes, clothing and appearance, accessories, resolution, orientation, icons, emojis, logos, watermarks, etc. It should be understood that this list of attributes is exemplary only, and should be not read as limiting the scope of this disclosure.

Other types of features of the images in the training dataset also can be extracted from the image 202. It should be understood that while the image features 210 are depicted as a single entity in FIG. 2 for illustrative purposes, in some implementations separate sets of image features 210 may be extracted by each of the one or more artificial intelligence models 204, the one or more computer vision services 206, and the other data analysis techniques 208. The image feature manager 110 can process these separate sets of features, for example by altering a format of the feature sets or combining the feature sets, to produce the image features 210. The image feature manager 110 can store the image features 210 in a data store 212. In some implementations, the data store 212 can correspond to electronic storage 146 of FIG. 2.

Figure 3:
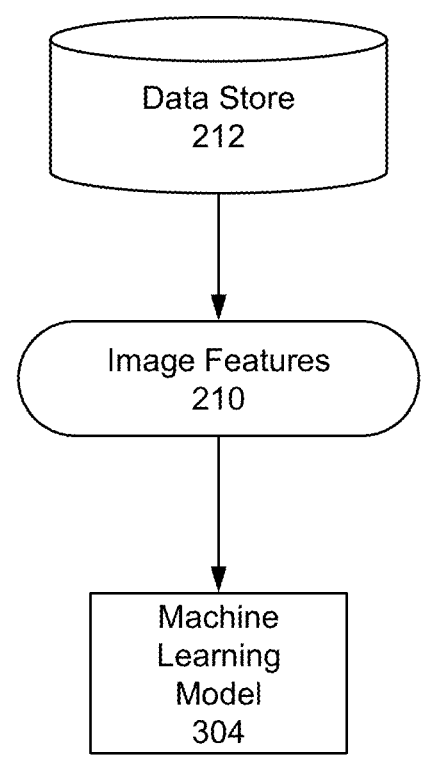
FIGS. 3 and 4 illustrate data flow in a process for training a machine learning model, in accordance with one or more implementations.
Figure 4:
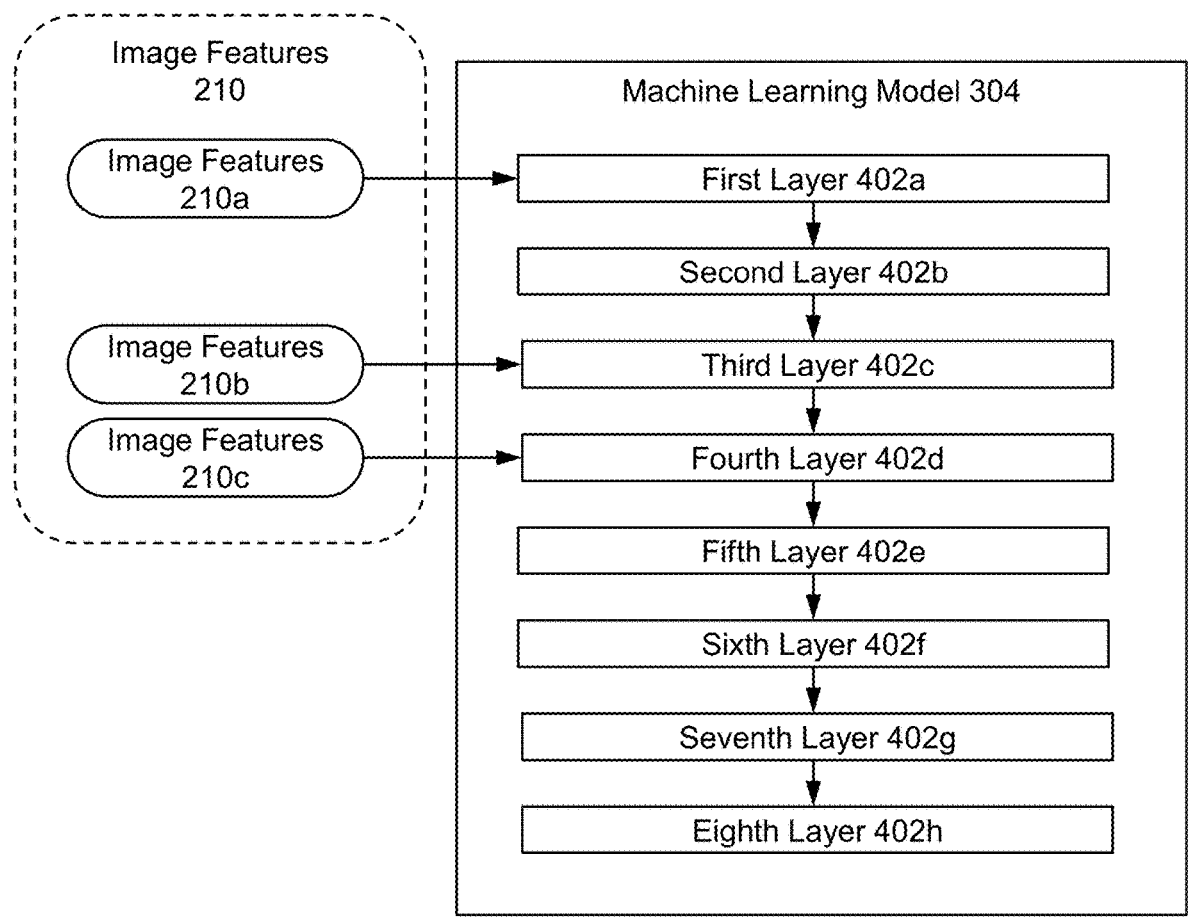

FIGS. 3 and 4 illustrate data flow in processes for training a machine learning model, in accordance with one or more implementations. The process 300 of FIG. 3 and the process 400 of FIG. 4 can make use of the image features 210 extracted in the process 200 of FIG. 2. For example, as shown in FIG. 3, the image features 210 can be retrieved from the data store 212 and introduced into a machine learning model 304. In some examples, the machine learning model 304 can be an artificial neural network, similar in structure to those described above. For example, the machine learning model 304 can include a plurality of nodes or artificial neurons arranged in sequential layers. FIG. 4 shows the layered structure of the machine learning model 304, which includes layers 402a-402h. The first layer 402a can serve as an input layer, the eighth layer 402h can serve as an output layer, and the remaining layers 402b-402g can be intermediate layers. In some examples, the intermediate layers 402b-402g can be referred to as hidden layers, because their outputs are typically abstracted from outside of the machine learning model 304.

In one example technique for training the machine learning model 304, an "end-to-end." approach can be used. For example, in an end-to-end approach, all of the image features 210 can be introduced at the input layer 402a of the machine learning model 304, and can be propagated through each layer 402 of the machine learning model 304. Stated differently, all of the image features 210 can be introduced at the input layer 402a, causing all of the nodes in that layer to produce output signals that are transmitted to the second layer 402b. This process is repeated as successive layers 402 of the machine learning model 304. Thus, all the image features 210 for a given image are propagated through the layers 402 of the machine learning model 304 as part of the training process for the machine learning model 304. In some implementations, some of all of image features 210 can be propagated from earlier layers 402 (e.g., layers closer to the input layer 402a) to later layers (e.g., layers 402 closer to the output layer 402h). This may be referred to as forward propagation. In some other implementations, some or all of the image features 210 can be propagated from later layers 402 to earlier layers 402 (e.g., back propagation). The machine learning model 402a can be trained based on the image features 210 for each image, along with the corresponding engagement metric for the image, in order to train the machine learning model 304 to learn to produce predicted engagement metrics for images based on features extracted from those images. A predicted engagement metric can also be referred to as a performance score for the image. In another example of an end-to-end approach, the raw image data itself (rather than the extracted image features 210) for the training data set can be introduced at the input layer 402a of the machine learning model 304.

In some implementations, using an end-to-end approach can be simple. However, the machine learning model 304 may produce inaccurate results if trained in this manner. For example, because of the wide variety of features included in visual content and diverse tastes across different target audiences, the search space (i.e. the diverse number of image attributes and characteristics) for this training task can be very large. As a result, accurately training the machine learning model 304 in this manner can require a massive set of training images. Training images can be difficult to gather for a given target audience, as described above, and therefore a sufficiently large set of training images may not be available. In addition, an end-to-end approach would require a very large architecture (e.g., a large number of nodes in each layer 402, each of which processes the entire volume of image data in the set of training images) and may yield unsatisfactory results.

To address these challenges, the process 400 of FIG. 4 shows an alternative to the end-to-end approach that is more computationally efficient and can result in an accurately trained machine learning model 304 with a smaller training dataset. As shown, the image features 210 can be divided into subsets of image features 210a, 210b, and 210c. Generally, the subsets of image features 210a, 210b, and 210c can be non-overlapping with one another. In some implementations, the subsets of image features 210a, 210b, and 210c can be grouped according to categories or types of features, such as object features, scene features, color features, etc. The subsets of features 210a, 210b, and 210c can be introduced into the machine learning model 304 at different layers selected to optimize or improve the training of the machine learning model 304 relative to an end-to-end approach.

Introducing the extracted image features 210 into the machine learning model 304 in this way can help to guide the machine learning model 304 to evaluate images in predefined directions. For example, the machine learning model 304 can be provided with information regarding the factors that contribute to a human's judgment of images, thereby training the machine learning model 304 to evaluate images in a manner similar that of the humans who make up the target audience. As a result, the search space can be reduced to a more manageable complexity, and training can be accomplished with a smaller set of training data.

In some implementations, larger subsets of image features 210 can be introduced at earlier layers of the machine learning model 304 (i.e., layers closer to the input layer), while smaller subsets of image features 210 can be introduced at later layers of the machine learning model 304 (i.e., layers closer to the output layer). This approach can help to ensure that the smaller subsets of features are considered by the machine learning model 304, and are not overwhelmed by larger subsets of features. In an example, the subset of image features 210a can be or can include object features (e.g., features that relate to types of objects included in an image). In some implementations, the subset of image features 210a can optionally also include scene features. For example, a vector or tensor representing the object features can be combined with a vector or tensor representing scene features, such as by concatenating the two vectors or tensors. The combined vectors or tensors can be the subset of image features 210a. Object features and scene features can be relatively important factors in evaluating an image, and the associated datasets can be relatively large. For these reasons, the subset of image features 210a can be introduced into the first layer 402a of the machine learning model 304.

Continuing with this example, the subset of image features 210b can include color features. In some implementations, color features may be less important to an evaluation of an image than object features or scene features, and can therefore be introduced into the machine learning model 304 downstream from the input layer 402a. In the example of FIG. 4, the subset of image features 210b can be introduced at the third layer 402c. The subset of image features 210c can include all other features extracted from the image (e.g., any image feature not categorized as an object feature, a scene feature, or a color feature) and can be introduced downstream from the point of introduction for the subset of features 210b, for example in the fourth layer 402d. This arrangement can be more efficient than the alternatives (e.g., an end-to-end arrangement), as it reduces the computational cost and the data requirement for the training. Higher efficiency is the result of providing the machine learning model 304 with extra information regarding the features that form human's perception of the performance of an image.

The problem of predicting a performance score representing the likely performance of an image can be a regression problem. However, due to the high complexity of such a regression problem, it may be difficult to achieve accurate results using only a regression layer at the output of the machine learning model 304 (e.g., the eighth layer 402h). To address this technical challenge, in some implementations, the accuracy of this regression problem can be improved by defining two loss functions that are trained according to the training dataset. A first loss function can be used one to guide the machine learning model 304 to learn the rough prediction of scores. For example, a rough or coarse prediction can be determined using a classification layer as one of the plurality of layers 402 of the machine learning model 304. The classification layer can be trained to determine probabilities for each of a plurality of ranges of performance scores for an image. For example, a performance score can be an integer value from 1 to 100, with higher values indicating better predicted performance. The classification layer of the machine learning model 304 can be trained to determine probabilities for discrete subranges within the entire possible range, such as a first probability that the performance score is between 1 and 10, a second probability that the performance score is between 11 and 20, a third probability that the performance score is between 21 and 30, etc. This example is illustrative only, and should not be viewed as limiting. In other examples, the classification layer of the machine learning model 304 can be trained to determine probabilities for other subranges. For example, the classification layer of the machine learning model 304 can be rained to determine probabilities for two subranges, such as a first probability that the performance score is "low" (e.g., between 1 and 50) and a second probability that the performance score is "high" (e.g., between 51 and 100).

A second loss function can also be defined to learn a more accurate final score, based on the rough or coarse range determined by the classification layer. In some implementations, the second loss function can be implemented by a regression layer downstream from the classification layer. Thus, the overall loss function for the machine learning model 304 can be a combination of the classification loss and the regression loss. The classification loss function can help to guide the model through the coarse range of scores, while the regression loss function is responsible for identifying one particular performance score (e.g., a single integer value) based on the probabilities identified by the classification layer. In such an example, the final layer (i.e., the eighth layer 402h as shown in FIG. 4) can be the regression layer, and the layer immediately upstream from the final layer (e.g., the seventh layer 402g as shown in FIG. 4) can be the classification layer. In some other implementations, the machine learning model 304 can have only a classification layer without a regression layer, or only a regression layer without a classification layer, or only output a feature embedding.

It should be appreciated that the particular arrangement described here and depicted in FIG. 4 is illustrative only, and represents only one example. In other implementations, the machine learning model 304 may have a different structure without departing from the scope of this disclosure. For example, the machine learning model 304 may have more or fewer layers than are depicted in FIG. 4. In addition, the image features 210 may be divided into more or fewer subsets than are depicted in FIG. 4, and each subset can be introduced at a different layer than depicted in FIG. 4, without departing from the scope of this disclosure.

FIGS. 3 and 4 show the general approach for propagating image features 210 for a single image 202 through the layers of the machine learning model 304 in order to train the model. It should be appreciated that these processes may be repeated with image features 210 from the other images 202 in the training dataset, along with their corresponding normalized engagement metrics, to train the machine learning model 304. In some examples, all of the image features 210 for all of the images in the training dataset also can be used to train additional variants of the machine learning model 304 in a similar manner. For example, additional variants of the machine learning model 304 can be structurally similar to what is depicted in FIG. 4, but may be configured to apply different weights to different subsets of the image features 210 for training purposes.

Figure 5:
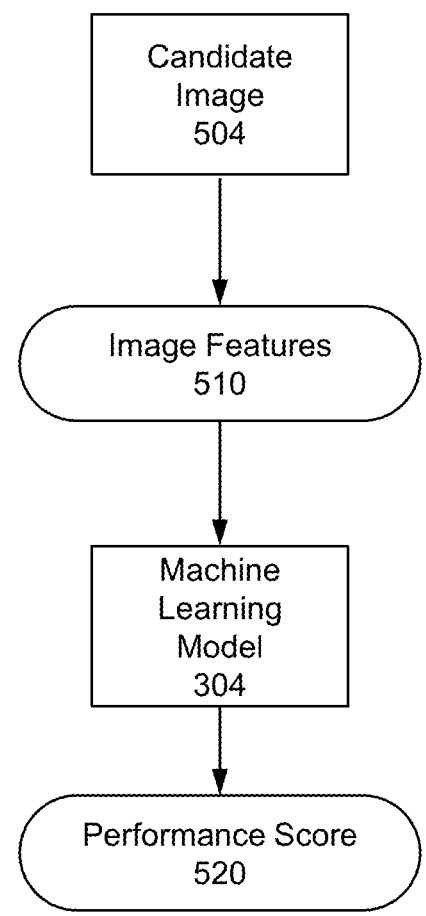
FIG. 5 illustrates data flow in a process for generating a performance score for an image, in accordance with one or more implementations.

FIG. 5 illustrates data flow in a process 500 for generating a performance score for a candidate image 504, in accordance with one or more implementations. In some implementations, the process 500 can be performed by the performance score manager 112 of FIG. 1. The process 500 can make use of the machine learning model 304 that has been trained according to the processes 300 and 400 shown in FIGS. 3 and 4, respectively. The candidate image can be any image whose likely performance among a target audience is of interest. For example, a user of one of the client computing devices 104 may submit the candidate image 504 for scoring prior to publishing the candidate image 504. In some implementations, a user may submit more than one candidate image 504 and each candidate image 504 can be scored separately, so that the predicted performance of each candidate image 504 can be compared to the others.

In some implementations, data flow for scoring the candidate image 504 can be similar to data flow for training the machine learning model 304 with each image of the training data. For example, rather than processing the raw image data (e.g., pixel data) for the candidate image 504 using the machine learning model 304, a set of image features 510 can first be extracted from the candidate image 504. In some implementations, the image features 510 can be extracted from the candidate image 504 using the same or similar techniques described above for extracting the image features 210 from an image 204. For example, as show in FIG. 2, one or more AI models 204, one or more computer vision services 206, and other data analysis techniques 208 can be used to extract features from the candidate image 504. In some implementations, the one or more AI models 204, the one or more computer vision services 206, and the other data analysis techniques 208 may be or may include artificial neural networks having layered structures, and features may be extracted from intermediate layers of these artificial neural networks.

In some implementations, the performance score manager 112 can propagate the image features 510 of the candidate image 504 through the trained machine learning model 304. For example, the image features 510 of the candidate image 504 can be introduced and propagated through the layers of the machine learning model 304 in the same manner or a similar manner used for training of the machine learning model 304. Thus, the image features 510 can be divided into subsets of image features, and each subset can be introduced at a different layer of the machine learning model 304. For example, the image features 510 can be grouped into smaller subsets according to categories or types of features, such as object features, scene features, color features, etc. The subsets of the image features 510 can be introduced into the machine learning model 304 at different layers selected to optimize or improve the training of the machine learning model 304 relative to an end-to-end approach.

The trained machine learning model 304 can process the image features 510 of the candidate image 504 to generate a performance score 520 for the candidate image. In some implementations, the performance score 520 can be selected from among a plurality of possible performance scores (e.g., an integer value within a predetermined range, a decimal value between 0 and 1, etc.). The performance score 520 can be determined by the machine learning model 304 based on both a classification analysis and a regression analysis, as described above. In some implementations, the process 500 can also be repeated using one or more variants of the machine learning model 304, each of which may calculate a respective performance score 520. In some implementations, the performance score manager 112 can be configured to select an overall performance score based on any number of performance scores 520 calculated by different variants of the machine learning model 304. For example, the performance score manager 112 can be configured to select the overall performance score as an average of the performance scores 520 calculated by a plurality of variants of the machine learning model 304.

In some implementations, server(s) 102, client computing platform(s) 104, and/or external resources 144 may be operatively linked via one or more electronic communication links. For example, such electronic communication links may be established, at least in part, via a network such as the Internet and/or other networks. Thus, the client computing platform(s) 104 may transmit data (e.g., image data) to the server(s) 102 by way of the Internet or other networks. In some implementations, the client computing platform(s) 104 may execute a web browser application that can interface with the server(s) 102 via one or more websites hosted by the server(s) 102. For example, the server(s) 102 may provide an application programming interface (API) that can be accessed by the client computing platform(s) 104 by way of such a website. In some implementations, the client computing platform(s) 104 may instead access such an API by other means (e.g., via a dedicated application that executes on the client computing platform(s) 104, rather than through a website). In some implementations, functionality described as being performed by the server(s) 102 may instead be performed directly by the client computing platform(s) or by the external resources 144). It will be appreciated that this is not intended to be limiting, and that the scope of this disclosure includes implementations in which server(s) 102, client computing platform(s) 104, and/or external resources 144 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 144, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, a server, and/or other computing platforms.

External resources 144 may include sources of information outside of system 100, external entities participating with system 100, and/or other resources. In some implementations, some or all of the functionality attributed herein to external resources 144 may be provided by resources included in system 100.

Server(s) 102 may include electronic storage 146, one or more processors 148, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 146 may comprise non-transitory storage media that electronically stores information. The electronic storage media of electronic storage 146 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 146 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 146 may include one or more virtual storage resources (e.g., cloud storage, a virtual private network, and/or other virtual storage resources). Electronic storage 146 may store software algorithms, information determined by processor(s) 148, information received from server(s) 102, information received from client computing platform(s) 104, and/or other information that enables server(s) 102 to function as described herein.

Processor(s) 148 may be configured to provide information processing capabilities in server(s) 102. As such, processor(s) 148 may include one or more of a digital processor, an analog processor, a digital circuit designed to process information, an analog circuit designed to process information, a state machine, and/or other mechanisms for electronically processing information. Although processor(s) 148 is shown in FIG. 1 as a single entity, this is for illustrative purposes only. In some implementations, processor(s) 148 may include a plurality of processing units. These processing units may be physically located within the same device, or processor(s) 148 may represent processing functionality of a plurality of devices operating in coordination. Processor(s) 148 may be configured to execute modules 108, 110, 112, and/or 114, and/or other modules. Processor(s) 148 may be configured to execute modules 108, 110, 112, and/or 114, and/or other modules by software; hardware; firmware; some combination of software, hardware, and/or firmware; and/or other mechanisms for configuring processing capabilities on processor(s) 148. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, and/or 114 are illustrated in FIG. 1 as being implemented within a single processing unit, in implementations in which processor(s) 148 includes multiple processing units, one or more of modules 108, 110, 112, and/or 114 may be implemented remotely from the other modules. The description of the functionality provided by the different modules 108, 110, 112, and/or 114 described below is for illustrative purposes, and is not intended to be limiting, as any of modules 108, 110, 112, and/or 114 may provide more or less functionality than is described. For example, one or more of modules 108, 110, 112, and/or 114 may be eliminated, and some or all of its functionality may be provided by other ones of modules 108, 110, 112, and/or 114. As another example, processor(s) 148 may be configured to execute one or more additional modules that may perform some or all of the functionality attributed below to one of modules 108, 110, 112, and/or 114.

Figure 6:
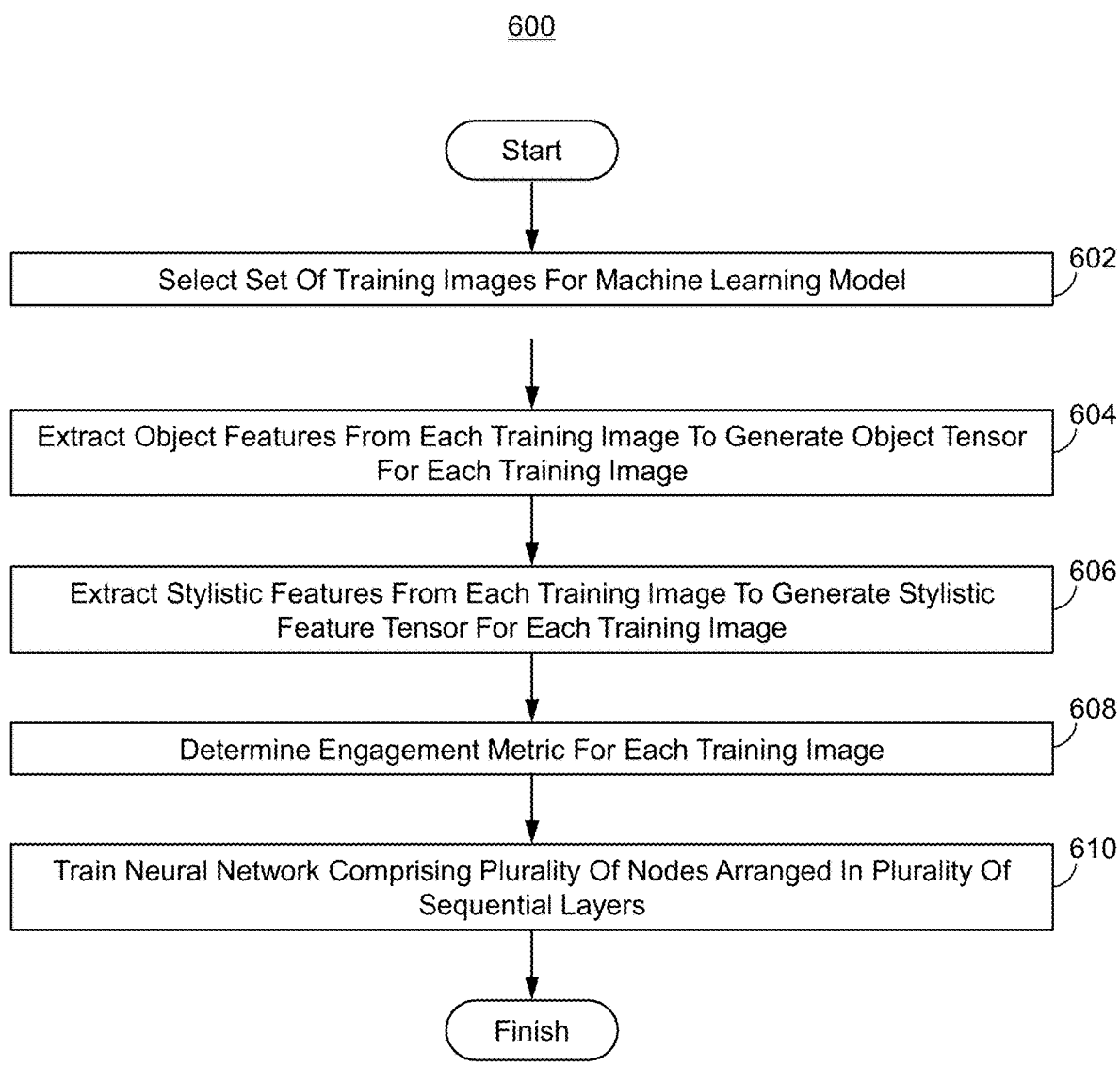
FIG. 6 illustrates a method for training a machine learning model, in accordance with one or more implementations.

FIG. 6 illustrates a method 600 for training a machine learning model, in accordance with one or more implementations. The operations of method 600 presented below are intended to be illustrative. In some implementations, method 600 may be accomplished with one or more additional operations not described, and/or without one or more of the operations discussed. Additionally, the order in which the operations of method 600 are illustrated in FIG. 6 and described below is not intended to be limiting.

In some implementations, method 600 may be implemented in one or more processing devices (e.g., a digital processor, an analog processor, a digital circuit designed to process information, an analog circuit designed to process information, a state machine, and/or other mechanisms for electronically processing information), such as the server 102 of FIG. 1. The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

An operation 602 may include selecting a set of training images for a machine learning model. Operation 602 may be performed by one or more hardware processors configured by machine-readable instructions including a module that is the same as or similar to the training data manager 108, in accordance with one or more implementations. In some implementations, a target audience can be identified. In some implementations, the set of training images can be selected based at least in part on such a target audience.

An operation 604 may include extracting object features from each training image to generate an object tensor for each training image. Operation 604 may be performed by one or more hardware processors configured by machine-readable instructions including a module that is the same as or similar to the image feature manager 110, in accordance with one or more implementations.

An operation 606 may include extracting stylistic features from each training image to generate a stylistic feature tensor for each training image. Operation 606 may be performed by one or more hardware processors configured by machine-readable instructions including a module that is the same as or similar to the image feature manager 110, in accordance with one or more implementations.

An operation 608 may include determining an engagement metric for each training image. The engagement metric corresponding to a performance score. Operation 608 may be performed by one or more hardware processors configured by machine-readable instructions including a module that is the same as or similar to the training data manager 108, in accordance with one or more implementations.

An operation 610 may include training a neural network including a plurality of nodes arranged in a plurality of sequential layers. Training the neural network may include propagating information included in the object tensor for each training image through each layer of the neural network including an input layer and propagating information included in the style tensor for each training image through a subset of the layers of the neural network not including the input layer. The layers of the neural network may include at least a classification layer to determine probabilities for each of a plurality of ranges of performance scores for a candidate image. Operation 610 may be performed by one or more hardware processors configured by machine-readable instructions including a module that is the same as or similar to the training data manager 108, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for training a machine learning model, the system comprising:
one or more hardware processors configured by machine-readable instructions to:
select a set of training images for a machine learning model;
extract first features of a first feature category from each training image to generate a first tensor of the first feature category for each training image;
extract second features of a second feature category from each training image to generate a second tensor of the second feature category for each training image, wherein the first feature category is one of an object category, a scene category, or a color category, and the second feature category is a different one of the object category, the scene category, or the color category;
determine an engagement metric for each training image, the engagement metric corresponding to a performance score; and
train a neural network comprising a plurality of nodes arranged in a plurality of sequential layers including an input layer and an output layer downstream from the input layer, wherein training the neural network includes:

propagating information included in the first tensor of the first feature category for each training image through each layer of the neural network including the input layer;

inserting, from a location outside of the neural network into the neural network at a first sequential layer subsequent to the input layer, information included in the second tensor of the second feature category for each training image, the first sequential layer selected based on a size of the second tensor or a predictive power of the second feature category for the set of training images; and propagating the information included in the second tensor for each training image through a subset of the plurality of sequential layers of the neural network subsequent to the first sequential layer.

2. The system of claim 1, wherein the layers of the neural network further comprise a classification layer to determine probabilities for each of a plurality of ranges of performance scores for a candidate image, and a regression layer, downstream from the classification layer, to determine a first performance score based on the probabilities determined by the classification layer.

3. The system of claim 1, wherein the one or more hardware processors are further configured by machine-readable instructions to:

identify a target audience;

determine a first web-based property associated with the target audience, the first web-based property including a plurality of images, based on engagement of the target audience with the plurality of images;

determine a plurality of additional web-based properties associated with the target audience, the plurality of additional web-based properties each including a respective additional plurality of images;

identify a subset of web-based properties from among the first web-based property and the additional web-based properties that are most uniquely visited by the target audience; and select the set of training images from among the images included in the subset of web-based properties.

4. The system of claim 3, wherein the one or more hardware processors are further configured by machine-readable instructions to:

determine a respective visual influence metric for each of the first web-based property and the plurality of additional web-based properties; and identify the subset of web-based properties based on the respective visual influence metrics.

5. The system of claim 3, wherein at least one web-based property of the subset of web-based properties comprises a social media account.

6. The system of claim 3, wherein the one or more hardware processors are further configured by machine-readable instructions to normalize the engagement metric for each training image based on a size of its audience.

7. The system of claim 6, wherein the one or more hardware processors are further configured by machine-readable instructions to normalize the engagement metric for each training image based on engagement of the audience with the plurality of images included in the respective web-based property over time.

8. The system of claim 1, wherein the neural network is a first neural network, and wherein the machine-readable instructions that cause the one or more hardware processors to extract the first features from each training image further comprise instructions to:

propagate data corresponding to each training image through a second neural network comprising an input layer, a plurality of intermediate layers, and an output layer; and extract outputs from at least one of the plurality of intermediate layers of the second neural network.

9. The system of claim 1, wherein the one or more hardware processors are further configured by machine-readable instructions to:

extract third features from each training image to generate a third tensor for each training image;

concatenate the first sensor and the third tensor for each training image to generate a concatenated tensor for each training image; and propagate information included in the concatenated tensor for each training image through each layer of the neural network including the input layer of the neural network.

10. The system of claim 1, wherein the one or more hardware processors are further configured by machine-readable instructions to:

extract at least one of a set of intensity features, a set of color features, a set of composition features, a set of contrast features, or a set of blurriness features from each training image; and propagate the at least one of the set of intensity features, the set of color features, the set of composition features, the set of contrast features, and the set of blurriness features from each training image through a second subset of the layers of the neural network not including the input layer to further train the neural network.

11. The system of claim 1, wherein the one or more hardware processors are further configured by machine-readable instructions to:

identify a candidate image; and propagate data corresponding to the candidate image through the neural network to determine a performance score for the candidate image, subsequent to training the neural network.

12. The system of claim 1, wherein the one or more hardware processors are further configured by machine-readable instructions to:

receive a selection of a target audience;

identify a candidate image;

identify the neural network based on the selected target audience; and propagate data corresponding to the candidate image through the neural network to determine a performance score for the candidate image, subsequent to training the neural network.

13. The system of claim 1, wherein the one or more hardware processors are further configured by machine-readable instructions to:

identify a candidate image;

propagate data corresponding to the candidate image through the neural network to determine a performance score for the candidate image, subsequent to training the neural network; and transmit the performance score to a computing device.

14. A computer-implemented method for training a machine learning model, the method comprising:

selecting a set of training images for a machine learning model;

extracting first features of a first feature category from each training image to generate a first tensor of the first feature category for each training image;

extracting second features of a second feature category from each training image to generate a second tensor of the second feature category for each training image, wherein the first feature category is one of an object category, a scene category, or a color category, and the second feature category is a different one of the object category, the scene category, or the color category;

determining an engagement metric for each training image, the engagement metric corresponding to a performance score; and training a neural network comprising a plurality of nodes arranged in a plurality of sequential layers including an input layer and an output layer downstream from the input layer, wherein training the neural network includes:

propagating information included in the first tensor for each training image through each layer of the neural network including the input layer;

inserting, from a location outside of the neural network into the neural network at a first sequential layer subsequent to the input layer, information included in the second tensor of the second feature category for each training image, the first sequential layer selected based on a size of the second tensor or a predictive power of the second feature category for the set of training images; and propagating the information included in the second tensor for each training image through a subset of the plurality of sequential layers of the neural network subsequent to the first sequential layer.

15. The method of claim 14, wherein the layers of the neural network further comprise a classification layer to determine probabilities for each of a plurality of ranges of performance scores for a candidate image, and a regression layer, downstream from the classification layer, to determine a first performance score based on the probabilities determined by the classification layer.

16. The method of claim 14, further comprising:
identifying a target audience;
determining a first web-based property associated with the target audience, the first web-based property including a plurality of images, based on engagement of the target audience with the plurality of images;
determining a plurality of additional web-based properties associated with the target audience, the plurality of additional web-based properties each including a respective additional plurality of images;
identifying a subset of web-based properties from among the first web-based property and the additional web-based properties that are most uniquely visited by the target audience; and
selecting the set of training images from among the images included in the subset of web-based properties.

17. The method of claim 16, further comprising:
determining a respective visual influence metric for each of the first web-based property and the plurality of additional web-based properties; and
identifying the subset of web-based properties based on the respective visual influence metrics.

18. The method of claim 16, wherein at least one web-based property of the subset of web-based properties comprises a social media account.

19. The method of claim 16, further comprising normalizing the engagement metric for each training image based on a size of its audience.

20. The method of claim 19, further comprising normalizing the engagement metric for each training image based on engagement of the audience with the plurality of images included in the respective web-based property over time.

21. The method of claim 14, wherein the neural network is a first neural network, and wherein extracting the first features from each training image further comprises:
propagating data corresponding to each training image through a second neural network comprising an input layer, a plurality of intermediate layers, and an output layer; and
extracting outputs from at least one of the plurality of intermediate layers of the second neural network.

22. The method of claim 14, further comprising:
extracting third features from each training image to generate a third tensor for each training image;
concatenating the first tensor and the third tensor for each training image to generate a concatenated tensor for each training image; and
propagating information included in the concatenated tensor for each training image through each layer of the neural network including the input layer of the neural network.

23. The method of claim 14, further comprising:
extracting at least one of a set of intensity features, a set of color features, a set of composition features, a set of contrast features, or a set of blurriness features from each training image; and
propagating the at least one of the set of intensity features, the set of color features, the set of composition features, the set of contrast features, and the set of blurriness features from each training image through a second subset of the layers of the neural network not including the input layer to further train the neural network.

24. The method of claim 14, further comprising:
identifying a candidate image; and
propagating data corresponding to the candidate image through the neural network to determine a performance score for the candidate image, subsequent to training the neural network.

25. A non-transitory computer-readable storage medium having instructions embodied thereon, the instructions being executable by one or more processors to perform a method for training a machine learning model, the method comprising:
selecting a set of training images for a machine learning model;
extracting first features of a first feature category from each training image to generate a first tensor of the first feature category for each training image, wherein the first feature category is one of an object category, a scene category, or a color category, and the second feature category is a different one of the object category, the scene category, or the color category;
extracting second features of a second feature category from each training image to generate a second tensor of the second feature category for each training image;
determining an engagement metric for each training image, the engagement metric corresponding to a performance score; and
training a neural network comprising a plurality of nodes arranged in a plurality of sequential layers including an input layer and an output layer downstream from the input layer, wherein training the neural network includes:
propagating information included in the first tensor of the first feature category for each training image through each layer of the neural network including the input layer;

inserting, from a location outside of the neural network into the neural network at a first sequential layer subsequent to the input layer, information included in the second tensor of the second feature category for each training image, the first sequential layer selected based on a size of the second tensor or a predictive power of the second feature category for the set of training images; and propagating the information included in the second tensor for each training image through a subset of the plurality of sequential layers of the neural network subsequent to the first sequential layer.

26. The non-transitory computer-readable storage medium of claim 25, wherein the layers of the neural network further comprise a classification layer to determine probabilities for each of a plurality of ranges of performance scores for a candidate image, and a regression layer, downstream from the classification layer, to determine a first performance score based on the probabilities determined by the classification layer.

27. The non-transitory computer-readable storage medium of claim 25, wherein the method further comprises:
   identifying a target audience;
   determining a first web-based property associated with the target audience, the first web-based property including a plurality of images, based on engagement of the target audience with the plurality of images;
   determining a plurality of additional web-based properties associated with the target audience, the plurality of additional web-based properties each including a respective additional plurality of images;
   identifying a subset of web-based properties from among the first web-based property and the additional web-based properties that are most uniquely visited by the target audience; and
   selecting the set of training images from among the images included in the subset of web-based properties.

28. The non-transitory computer-readable storage medium of claim 27, wherein the method further comprises:
   determining a respective visual influence metric for each of the first web-based property and the plurality of additional web-based properties; and
   identifying the subset of web-based properties based on the respective visual influence metrics.

29. The non-transitory computer-readable storage medium of claim 27, wherein at least one web-based property of the subset of web-based properties comprises a social media account.

30. The non-transitory computer-readable storage medium of claim 27, wherein the method further comprises normalizing the engagement metric for each training image based on a size of its audience.

31. The non-transitory computer-readable storage medium of claim 30, wherein the method further comprises normalizing the engagement metric for each training image based on engagement of the audience with the plurality of images included in the respective web-based property over time.

32. The non-transitory computer-readable storage medium of claim 25, wherein extracting the first features from each training image further comprises:
   propagating data corresponding to each training image through a second neural network comprising an input layer, a plurality of intermediate layers, and an output layer; and
   extracting outputs from at least one of the plurality of intermediate layers of the object detection neural network.

* * * * *